Oct. 7, 1930.  F. L. MORSE  1,777,527
CHAIN ADJUSTING DEVICE
Filed Dec. 29, 1926   2 Sheets-Sheet 1

Inventor
Frank L. Morse
By his Attorneys
Synnestvedt & Lechner

Oct. 7, 1930.  F. L. MORSE  1,777,527
CHAIN ADJUSTING DEVICE
Filed Dec. 29, 1926  2 Sheets-Sheet 2

Inventor
Frank L. Morse
By his Attorneys
Synnestvedt & Lechner

Patented Oct. 7, 1930

1,777,527

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

CHAIN-ADJUSTING DEVICE

Application filed December 29, 1926. Serial No. 157,639.

This invention relates to improvements in chain adjusters operating to take up slack in endless chains and particularly to that class of chain adjusters which operate on the slack run of chain. The invention is especially useful in association with front end drives for automobiles.

One of the primary objects of my invention is to provide a simple and effective adjusting device of the character described which operates to keep the chain in proper running tension without producing excessive backbend in the chain.

Another object of my invention is to provide an adjusting device operating on the chain with a minimum of pressure thereagainst.

More specifically it is aimed to provide a chain adjusting device in which noise is very materially reduced.

How the foregoing, together with such other objects and advantages as may hereinafter appear, or are incident to the invention, are realized, is illustrated in preferred form in the accompanying drawings, wherein—

Figure 1:
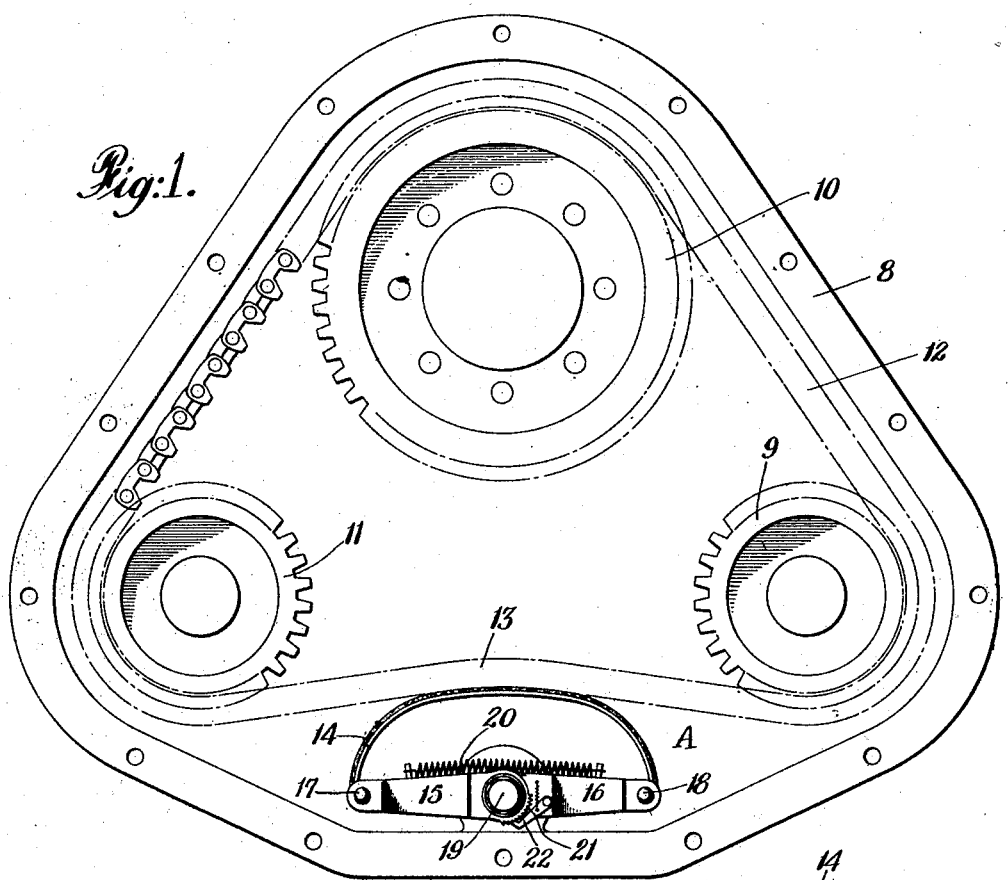
Fig. 1 is a face view of a typical front end drive for automobiles and illustrates the application of my improved adjusting device thereto.

Referring to the drawings, it will be seen that the particular device to which the invention is applied is a front end drive for automobiles of triangular lay-out, comprising a casing 8, a crank shaft sprocket 9, a cam shaft sprocket 10, and an accessory shaft sprocket 11, drivingly connected by means of the chain 12.

The adjusting device indicated by the reference letter A operates on the slack run of chain 13 to take up slack therein, which maintains the chain in proper running tension. This device comprises a shoe-like member 14, in this instance, formed of flexible metal, such as flat spring steel, connected at its ends to the free ends of the levers or pivoted arms 15 and 16 by means of the pins 17 and 18. It will be noted that this shoe-like member 14 has a chain contacting surface of considerable radius, which surface is preferably lined with noise absorbing material, such as durable leather. The levers 15 and 16 are pivotally mounted on the pin or stud 19, which stud is secured in the casing 8, and they are connected by means of a coil spring 20 operating on the levers in such manner that their free ends tend to move in an upward direction toward each other. Thus, it will be seen that there is a force operating on the shoe member 14 to press it against the slack run of chain 13 whereby any slack which may tend to develop in the chain is automatically taken up.

Figure 3:
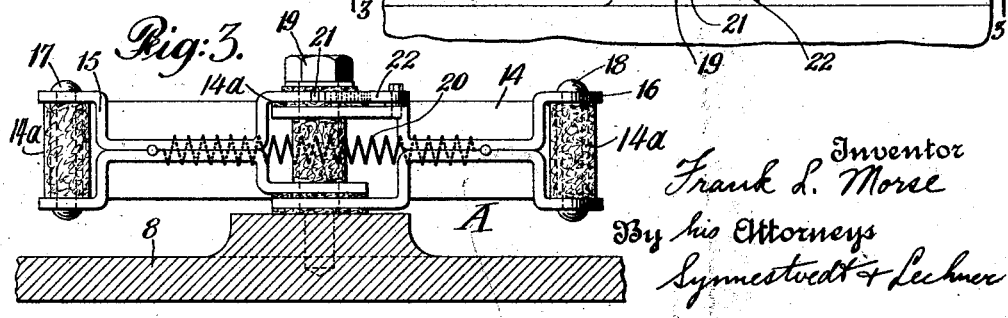
Fig. 3 is a section taken on the line 3—3 of Fig. 2, looking in the direction of the arrows.

In this connection, it is to be observed that by virtue of the fact that the contacting surface of the shoe member 14 is of considerable radius, the operation on the chain is such that excessive back-bend, when tensioning, does not result, and, consequently, the parts of the chain are not subjected to undue strains. It will also be noted, due to the fact that the adjusting device is rockingly mounted on the pin 19, that it is free to move to its position of least pressure against the chain. This, together with the curvature above mentioned, greatly reduces noise so that a comparatively quiet running device is obtained. To further insure quietness in operation, I have provided noise absorbing material 14$^a$ at the joints and at other points of the device where noise tends to occur, see Fig. 3.

In order to prevent the adjusting device from returning to positions of looser adjustment, I have provided means associated with the levers 15 and 16 for preventing their being moved against the action of the spring 20 comprising ratchet teeth 21 carried by one of the levers and a pawl 22 for engaging the ratchet teeth, the pawl being held in association with the teeth by means of a spring.

I am aware of the fact that adjusting devices operating on the slack run of the chain have been heretofore employed, but such devices employ sprocket wheels of small radius in comparison to the radius of the shoe 14, which, after several adjustments have been made, produces excessive back-bend of the chain, resulting in objectionable strains, wear and noises. It is here pointed out that owing to the nature of such sprocket wheel devices, it is impossible to sufficiently increase the diameter of the sprockets to obtain the advantages of the present invention because sufficient movement could not be obtained to properly tighten the chain.

Figure 4:
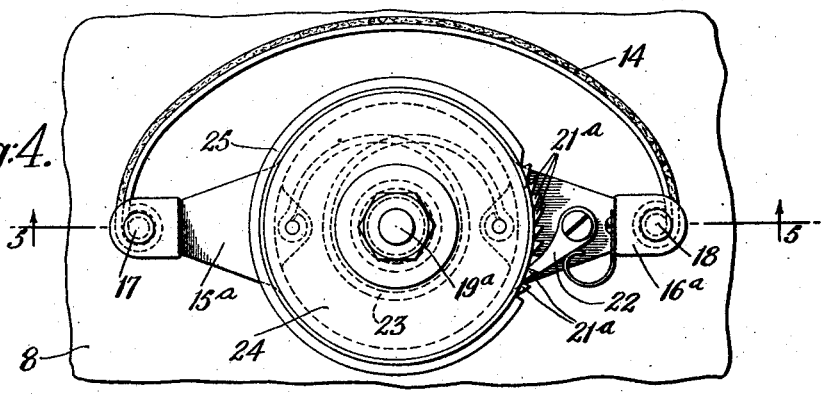
Fig. 4 is a face view of a modified form of the invention.
Figure 5:
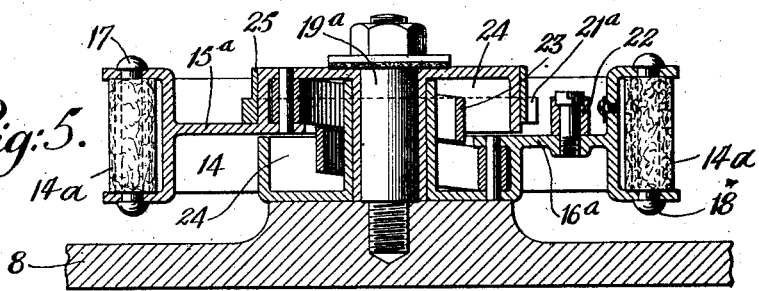
Fig. 5 is a section taken on the line 5—5 of Fig. 4.

In Figs. 4 and 5, I have shown a modification employing a spiral spring 23 for effecting the adjustment. In this instance, the levers 15$^a$ and 16$^a$ are provided with cupped portions 24 in which the spring 23 is housed. As before, these levers are pivotally carried by a pin 19$^a$ secured to the casing 8. In this instance, the ratchet teeth 21$^a$, for preventing backward movement of the levers, are formed on a ring 25 secured to the cupped portion of the lever 15$^a$. The pawl 22 is carried by the other lever.

Figure 6:
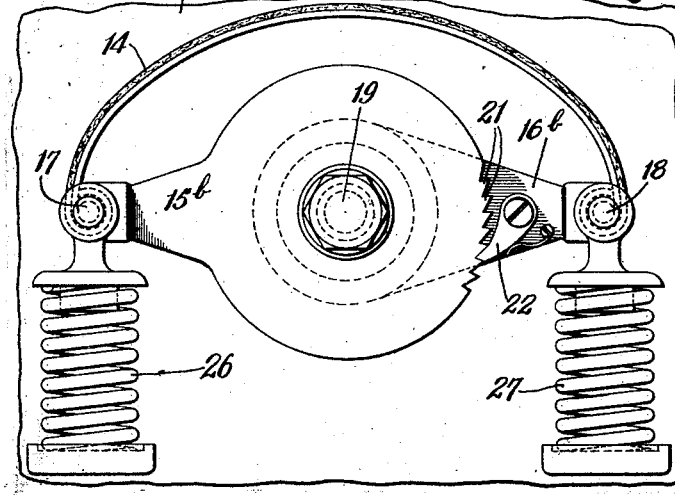

In Fig. 6 a modification is shown employing compression springs 26, and 27 acting on the ends of the levers 15$^b$ and 16$^b$, respectively.

Figure 7:
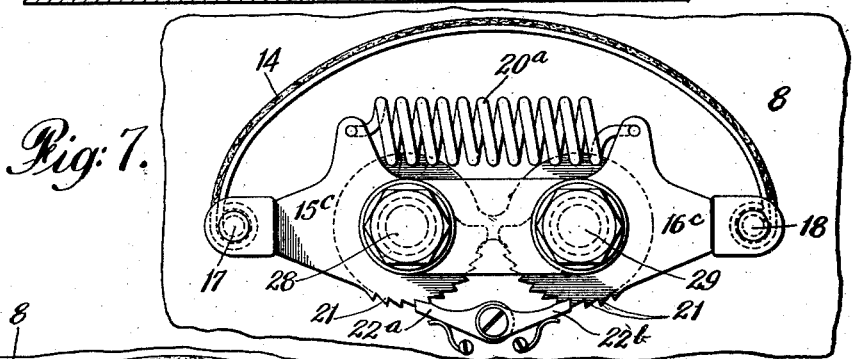
Figs. 6 and 7 are face views of still other modifications of the invention.

Referring to the modification shown in Fig. 7, it will be seen that two spaced pivot pins 28 and 29 are provided, and that the lever 15$^c$ is pivoted on the pin 28 and the lever 16$^c$ on the pin 29. A tension spring 20$^a$ is connected at one end to the lever 15$^c$ and at the other end to the lever 16$^c$ to function in a manner similar to the spring 20 of the preferred form. In this instance, ratchet teeth 21 are provided on each lever having associated therewith the spring pressed pawls 22$^a$ and 22$^b$ for the purpose of preventing backward movement of the levers.

Figure 2:
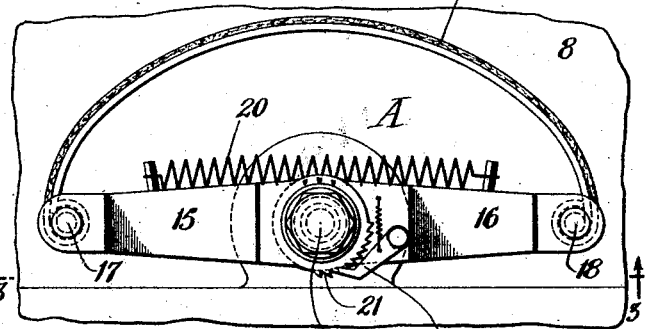
Fig. 2 is an enlarged face view of the adjusting device shown in Fig. 1.

From the foregoing, it will be seen that I have provided an adjusting device having very few parts, which parts are of simple construction whereby the device may be inexpensively manufactured. In this connection, it is pointed out that in Figs. 1 to 3, I have shown a form of the device in which the levers 15 and 16 may be very inexpensively made of pressed sheet metal. The amount of machine work in an adjuster constructed in accordance with my invention is very little.

I claim:—

1. The combination with an endless chain, of a shoe device operating on the chain to take up slack therein including a flexible shoe member, levers to the free ends of which said member is attached, and means for moving said levers whereby the shoe member is deflected and thereby caused to operate on the chain.

2. The combination with an endless chain, of a shoe device operating on the chain to take up slack therein including a flexible shoe member, levers to the free ends of which said member is attached, and automatic means for moving said levers whereby the shoe member is deflected and thereby caused to operate on the chain.

3. The combination with an endless chain, of a shoe device operating on the chain to take up slack therein including a flexible shoe member, levers to the free ends of which said member is attached, means for moving said levers whereby the shoe member is caused to operate on the chain, and means for preventing the shoe member from returning to positions of looser adjustment.

4. The combination with an endless chain, of a shoe device operating on the chain to take up slack therein including a shoe member, pivoted arms carrying said member, a pin on which said arms pivot and spring means tending to impart pivotal movement to the arms in a direction to cause the shoe member to take up slack in the chain.

In testimony whereof I have hereunto signed my name.

FRANK L. MORSE.